United States Patent
Rong et al.

(10) Patent No.: US 10,142,936 B2
(45) Date of Patent: Nov. 27, 2018

(54) SYSTEM AND METHOD FOR LOW POWER TRANSMISSION

(71) Applicant: Futurewei Technologies, Inc., Plano, TX (US)

(72) Inventors: Zhigang Rong, San Diego, CA (US); Younghoon Kwon, San Diego, CA (US); Yunsong Yang, San Diego, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 71 days.

(21) Appl. No.: 14/590,618

(22) Filed: Jan. 6, 2015

(65) Prior Publication Data

US 2015/0195790 A1    Jul. 9, 2015

Related U.S. Application Data

(60) Provisional application No. 61/924,023, filed on Jan. 6, 2014.

(51) Int. Cl.
*H04W 52/02* (2009.01)
*H04W 52/24* (2009.01)
*H04W 84/12* (2009.01)

(52) U.S. Cl.
CPC ..... *H04W 52/0261* (2013.01); *H04W 52/243* (2013.01); *H04W 52/0229* (2013.01); *H04W 84/12* (2013.01); *Y02D 70/00* (2018.01); *Y02D 70/142* (2018.01)

(58) Field of Classification Search
CPC ........... H04W 52/243; H04W 52/0261; H04W 52/0229; H04W 84/12; Y02D 70/142; Y02D 70/00

USPC .......... 370/252–311, 328–352; 455/435–522
See application file for complete search history.

(56) References Cited

U.S. PATENT DOCUMENTS

| | | | |
|---|---|---|---|
| 6,674,787 B1 * | 1/2004 | Dick | H04W 52/50 375/130 |
| 7,269,430 B2 * | 9/2007 | Moorti | H04L 5/0023 370/431 |
| 7,508,807 B2 * | 3/2009 | Dick | H04W 52/50 370/342 |
| 7,539,501 B2 * | 5/2009 | Moorti | H04B 1/38 370/290 |

(Continued)

FOREIGN PATENT DOCUMENTS

| | | |
|---|---|---|
| CN | 1627659 A | 6/2005 |
| CN | 101356775 A | 1/2009 |

(Continued)

OTHER PUBLICATIONS

Cariou, L., et al., "High-efficiency WLAN," IEEE 802.11-13/0331r5, Submission, Mar. 19, 2013, 21 pages.

(Continued)

*Primary Examiner* — Man U Phan
(74) *Attorney, Agent, or Firm* — Slater Matsil, LLP

(57) ABSTRACT

A method for operating a transmitting device includes generating a frame having a first preamble and a second preamble. The method also includes transmitting a first preamble at a first power level, and transmitting a subset of a second preamble at a second power level, wherein the first power level and the second power level differ.

40 Claims, 11 Drawing Sheets

(56) References Cited

U.S. PATENT DOCUMENTS

| | | | |
|---|---|---|---|
| 7,978,729 B2* | 7/2011 | Moorti | H04L 5/0023 |
| | | | 370/468 |
| 8,743,826 B2* | 6/2014 | Chin | H04W 36/0094 |
| | | | 370/331 |
| 9,380,466 B2* | 6/2016 | Eyuboglu | H04W 16/26 |
| 9,414,399 B2* | 8/2016 | Eyuboglu | H04W 72/12 |
| 2005/0147125 A1 | 7/2005 | Kim et al. | |
| 2006/0256709 A1 | 11/2006 | Yang | |
| 2008/0222236 A1 | 9/2008 | Nason et al. | |
| 2009/0103437 A1 | 4/2009 | Kim et al. | |
| 2009/0290516 A1 | 11/2009 | Han et al. | |
| 2011/0051705 A1* | 3/2011 | Jones, IV | H04L 27/2613 |
| | | | 370/338 |
| 2011/0161527 A1 | 6/2011 | Wittenschlaeger | |
| 2011/0305194 A1 | 12/2011 | Zheng et al. | |
| 2012/0082040 A1* | 4/2012 | Gong | H04W 74/0816 |
| | | | 370/252 |
| 2012/0250630 A1* | 10/2012 | Paiva | H04W 74/0833 |
| | | | 370/329 |
| 2013/0044828 A1* | 2/2013 | Jiang | H04B 3/542 |
| | | | 375/257 |
| 2013/0089124 A1* | 4/2013 | Kim | H04B 3/542 |
| | | | 375/222 |
| 2013/0155976 A1* | 6/2013 | Chen | H04W 72/0453 |
| | | | 370/329 |
| 2014/0126549 A1* | 5/2014 | Beale | H04W 16/08 |
| | | | 370/336 |
| 2015/0009894 A1* | 1/2015 | Vermani | H04L 1/0072 |
| | | | 370/328 |
| 2015/0036617 A1* | 2/2015 | Guo | H04W 74/0833 |
| | | | 370/329 |
| 2015/0131624 A1* | 5/2015 | Merlin | H04W 52/243 |
| | | | 370/336 |
| 2016/0081100 A1 | 3/2016 | Du et al. | |

FOREIGN PATENT DOCUMENTS

| | | |
|---|---|---|
| CN | 104184702 A | 12/2014 |
| WO | 2011035796 A1 | 3/2011 |
| WO | 2013028629 A2 | 2/2013 |

OTHER PUBLICATIONS

Cariou, L., et al., "High-efficiency WLAN Straw Poll," IEEE 802.11-13/0339r10, Submission, Mar. 19, 2013, 7 pages.

International Search Report and Written Opinion of Patent Cooperation Treaty (PCT), Application No. PCT/US2015/010321, Applicant: Huawei Technologies Co., Ltd., dated Sep. 2, 2015, 12 pages.

* cited by examiner

SYSTEM AND METHOD FOR LOW POWER TRANSMISSION

This application claims the benefit of U.S. Provisional Application No. 61/924,023, filed on Jan. 6, 2014, entitled "System and Method for Low Power Transmission," which application is hereby incorporated herein by reference.

TECHNICAL FIELD

The present invention relates to digital communications, and, in particular embodiments, to low power transmission.

BACKGROUND

The number of devices using Wireless Local Area Networks (WLAN) continues to show dramatic growth. WLANs allow users the ability to connect to high-speed services without being tethered to wireline connections. WLANs are wireless communications systems that are based on the IEEE 802.11 series of technical standards, also commonly referred to as WiFi. A popular deployment for WLANs is in an outdoor environment. An outdoor deployment presents a different environment than an indoor deployment with generally large and open coverage areas.

A newly formed IEEE 802.11 Study Group named "High Efficiency WLAN" (HEW) has been formed to study, among other things, improving system efficiency and area throughput, and improving real world performance in indoor and outdoor deployments in the presence of interfering sources and dense heterogeneous networks with moderate to heavy user loaded access points (APs). HEW's target usage scenario is a high density environment.

SUMMARY

Example embodiments of the present disclosure which provide a system and method for Low Power Transmission.

In accordance with an example embodiment of the present disclosure, a method for operating a transmitting device is provided. The method includes generating, by a transmitting device, a frame having a first preamble and a second preamble, and transmitting, by the transmitting device, a first preamble at a first power level. The method also includes transmitting, by the transmitting device, a subset of a second preamble at a second power level, wherein the first power level and the second power level differ.

In accordance with another example embodiment of the present disclosure, a method for operating a receiving device is provided. The method includes receiving, by the receiving device, a first preamble of a frame at a first power level, and receiving, by the receiving device, a subset of a second preamble of the frame at a second power level.

In accordance with another example embodiment of the present disclosure, a method for operating a neighbor device is provided. The method includes receiving, by the neighbor device, a first preamble of a frame at a first power level, and receiving, by the neighbor device, a subset of a second preamble of the frame. The method also includes determining, by the neighbor device, if a channel is idle in accordance with the first preamble and the subset of the second preamble, and transmitting, by the neighbor device, a transmission over the channel when the channel is idle.

In accordance with another example embodiment of the present disclosure, a transmitting device is provided. The transmitting device includes a processor, and a transmitter operatively coupled to the processor. The processor generates a frame having a first preamble and a second preamble. The transmitter transmits the first preamble at a first power level, and transmits a subset of the second preamble at a second power level, wherein the first power level and the second power level differ.

In accordance with another example embodiment of the present disclosure, a neighbor device is provided. The neighbor device includes a receiver, a processor operatively coupled to the receiver, and a transmitter operatively coupled to the processor. The receiver receives a first preamble of a frame at a first power level, and receives a subset of a second preamble of the frame. The processor determines if a channel is idle in accordance with the first preamble and the subset of the second preamble. The transmitter transmits a transmission over the channel when the channel is idle.

One advantage of an embodiment is that reduced transmission power is an effective way to decrease interference to other devices operating in the general vicinity.

A further advantage of an embodiment is that reduced transmission power allows for the deployment of more cells in a given area, thereby achieving greater cell splitting gain.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to low power transmission. For example, a transmitting device generates a frame having a first preamble and a second preamble. The transmitting device also transmits a first preamble at a first power level, and transmits a subset of a second preamble at a second power level, wherein the first power level and the second power level differ.

The present disclosure will be described with respect to example embodiments in a specific context, namely communications systems that use different transmission power to manage interference. The disclosure may be applied to standards compliant communications systems, such as those that are compliant with Third Generation Partnership Project (3GPP), IEEE 802.11, and the like, technical standards, and non-standards compliant communications systems, that use different transmission power to manage interference.

Figure 1:
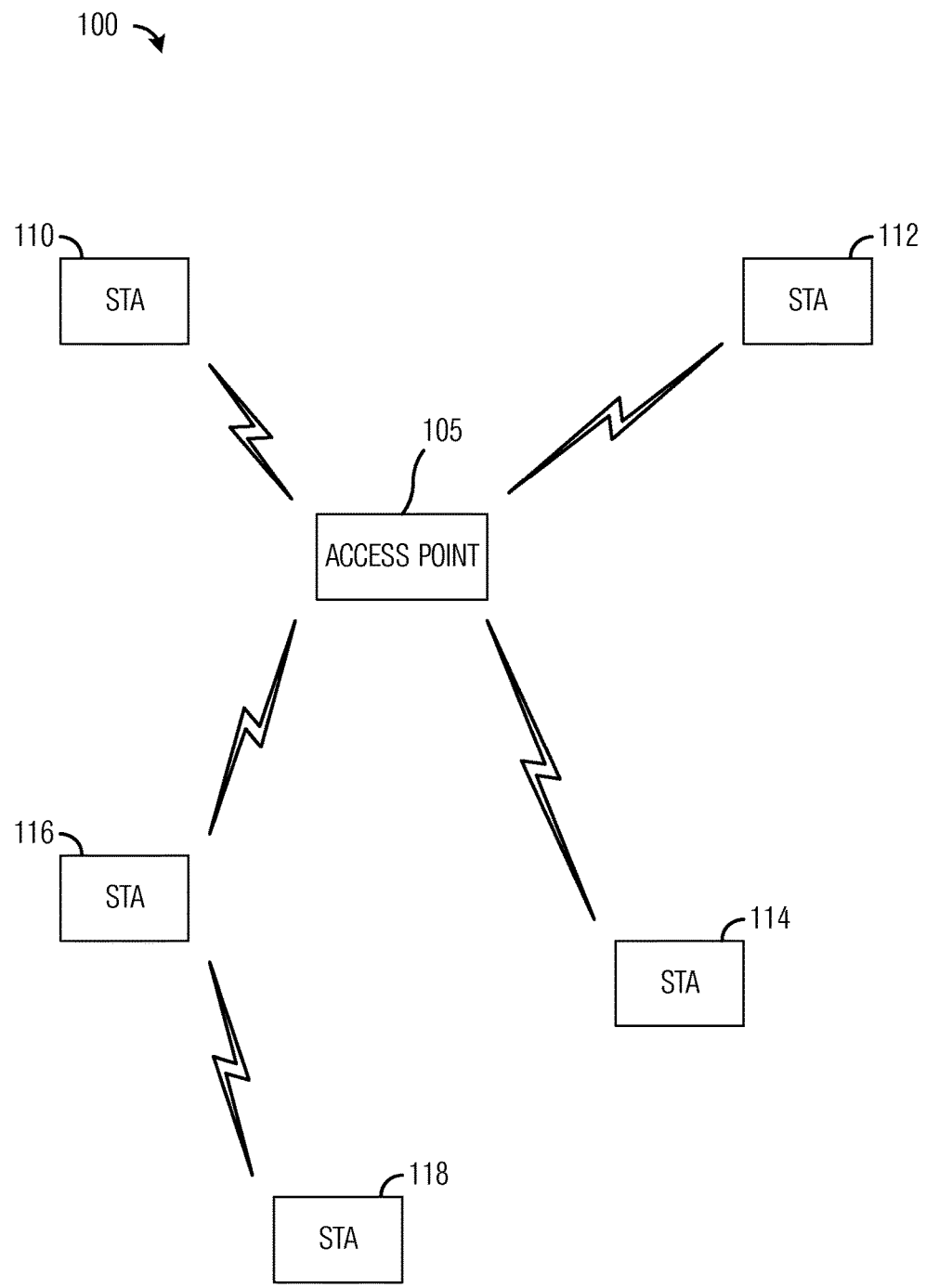
FIG. 1 illustrates an example wireless communications system in accordance with an embodiment.

FIG. 1 illustrates a wireless communications system 100. Wireless communications system 100 includes an access point (AP) 105 that serves one or more stations, such as stations (STA) 110-116, by receiving communications originating from the stations and then forwarding the communications to their intended destinations or receiving communications destined to the stations and then forwarding the communications to their intended stations. In addition to communicating through AP 105, some stations may directly communicate with one another. As an illustrative example, station 116 may transmit directly to station 118. APs may also be commonly referred to as NodeBs, evolved NodeBs (eNBs), base stations, controllers, communications controllers, and the like. Stations may also be commonly referred to as mobile stations, mobiles, user equipment (UE), terminals, users, subscribers, and the like.

Transmissions to and/or from a station occur on a shared wireless channel. WLANs make use of carrier sense multiple access with collision avoidance (CSMA/CA), where a station desiring to transmit needs to contend for access to the wireless channel before it can transmit. A station may contend for access to the wireless channel using a network allocation vector (NAV). The NAV may be set to a first value to represent that the wireless channel is busy and to a second value to represent that the wireless channel is idle. The NAV may be set by station in accordance with physical carrier sensing and/or reception of transmissions from other stations and/or APs. Therefore, contending for access to the wireless channel may require the station to expend a significant amount of time, thereby decreasing wireless channel utilization and overall efficiency. Furthermore, contending for access to the wireless channel may become difficult if not impossible as the number of stations contending for access increases.

Figure 2:
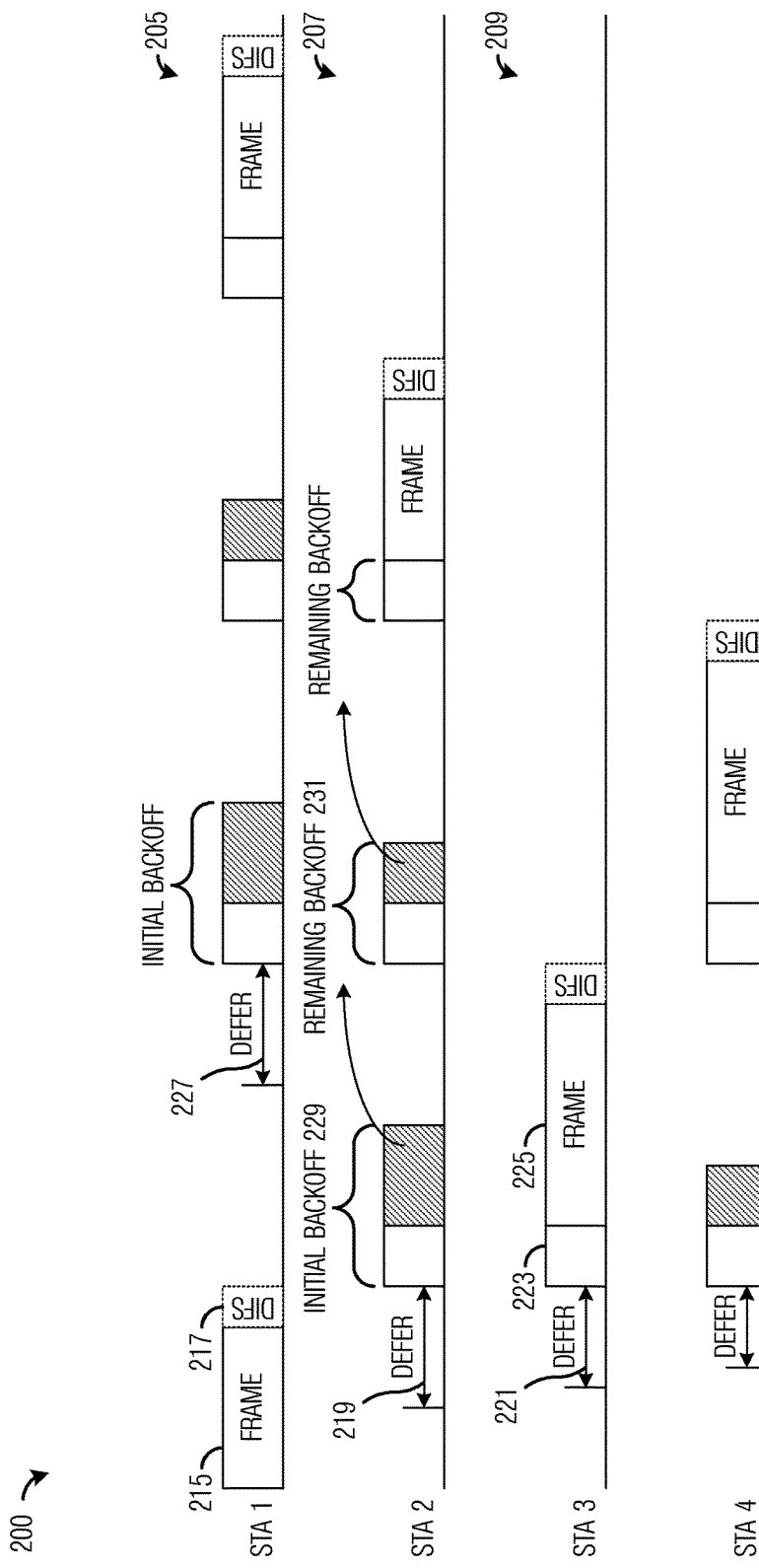
FIG. 2 illustrates a diagram of example channel access timing in accordance with an embodiment.

FIG. 2 illustrates a diagram 200 of channel access timing. A first trace 205 represents channel access for a first station (STA 1), a second trace 207 represents channel access for a second station (STA 2), and a third trace 209 represents channel access for a third station (STA 3). A short interframe space (SIFS) has a duration of 16 microseconds, a point coordination function (PCF) inter-frame space (PIFS) has a duration of 25 microseconds, while a DIFS may last longer than either the SIFS or the PIFS. A backoff period may be a random duration. Therefore, active scanning may not provide the best solution when there are large numbers of stations attempting to perform AP/network discovery.

In a high density environment, reducing the transmission power of a device (such as an AP and/or a STA) may be an effective way to decrease interference to other devices (such as APs and/or STAs). The reduction of the transmission power will reduce the cell size and achieve cell splitting gain, i.e., more cells may be deployed within a given area, achieving higher area throughput. However, when low transmission power (LTP) devices co-exist with legacy devices that transmit with high transmission power (HTP), the performance of the LTP devices will typically be negatively impacted.

The negative impact on LTP device performance may be due to the fact that in an IEEE 802.11 compliant communications system, before a device transmits, it performs a clear channel assessment (CCA) to determine if the wireless medium (channel) is busy. If the CCA indicates that the wireless medium is not busy, the device can initiate a transmission according to an enhanced distributed channel access (EDCA) technique. Otherwise, the device remains silent and wait for the next transmission opportunity. However, when a LTP device transmits, due to its low transmission power, nearby legacy devices may not be able to detect the transmission and the CCA of legacy devices may indicate that the wireless medium is not busy, therefore the legacy devices may start their own transmission, resulting in significant interference to the LTP device. The impact of the transmission of the legacy devices may be greater due to the high transmission power of the legacy devices.

Figure 3:
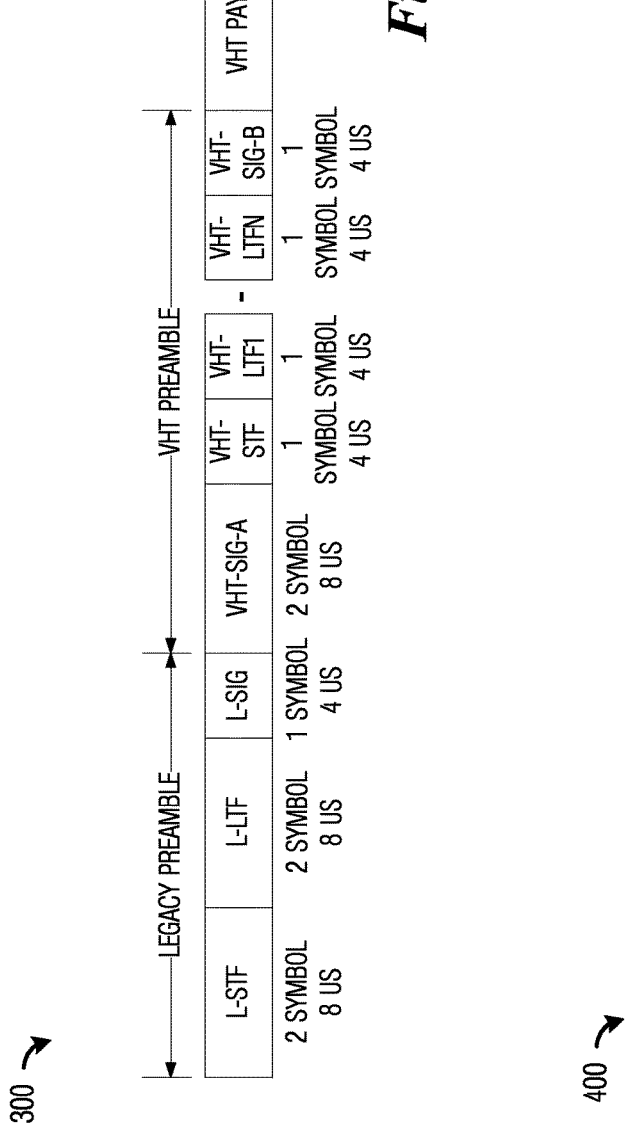
FIG. 3 illustrates a diagram of an example physical layer convergence layer (PLCP) frame used in an IEEE 802.11ac compliant communications system in accordance with an embodiment.

FIG. 3 illustrates a diagram of an example physical layer convergence layer (PLCP) frame 300 used in an IEEE 802.11ac compliant communications system. As shown in FIG. 3, the legacy portion (e.g., the legacy preamble) of PLCP frame 300 may be understood by both legacy devices and very high throughput (VHT) devices. An L-SIG field contains data rate and length information. When a legacy device performs a CCA and detects the L-SIG field from a VHT device, the legacy device may use the information to derive the duration of the VHT portion so that it will not transmit during that time window, thereby avoiding causing interference to the VHT device. It is noted that the preamble for legacy communications system (the legacy preamble), the VHT preamble, and a VHT payload are transmitted at the same power level.

Figure 4:
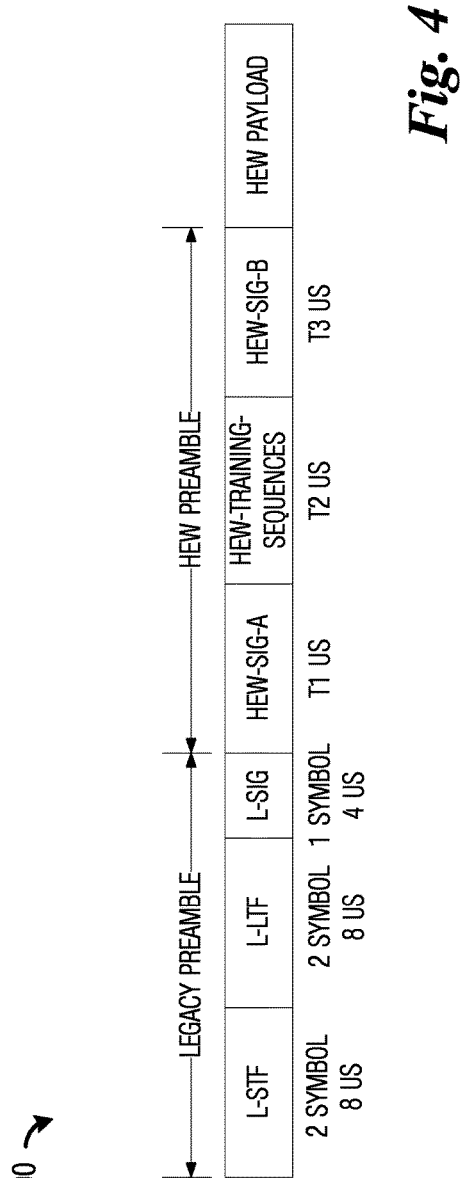
FIG. 4 illustrates a diagram of an example HEW PLCP frame in accordance with an embodiment.

FIG. 4 illustrates a diagram of an example HEW PLCP frame 400. It may be assumed that HEW PLCP frame 400 may have similar structure to that of PLCP frame 300 used in VHT communications systems. For HEW compliant LTP devices, if the preamble for legacy communications systems, the HEW preamble, and a HEW payload are transmitted at the same (e.g., low) power level, the L-SIG field may not be detectable by legacy HTP device. Therefore, the CCA performed by the legacy HTP device may indicate that the wireless medium is not busy and the legacy HTP device may start its transmission, which will cause significant interference to the HEW LTP device.

According to an example embodiment, utilizing the example HEW PLCP frame structure shown in FIG. 4, HEW LTP device may transmit the legacy preamble and HEW-SIG-A field at a high power level and transmit the HEW-Training-Sequences, HEW-SIG-B, and HEW payload at a low power level. The HEW-SIG-A comprises an indication indicating that the following HEW transmission (e.g., HEW-Training-Sequences, HEW-SIG-B, and HEW payload) will be in low power level. The HEW-SIG-A also comprises indications (e.g., data rate and length) that can be used to derive a more accurate estimation of the duration of HEW transmission. The high power level for legacy preamble will enable the nearby legacy device to detect the L-SIG, thereby deriving the duration of HEW transmission and thus restraining themselves from transmitting in that duration, avoiding causing interference to the HEW LTP device. The high power level for HEW-SIG-A can enable notifying the nearby HEW LTP device(s) that low power transmission will follow, therefore the nearby HEW LTP device(s) is allowed to transmit with low transmission power in the duration of the LTP HEW transmission if their CCA indicates that the channel is not busy. The low power level for the remaining HEW transmission (e.g., HEW-Training-Sequences, HEW-SIG-B, and HEW payload) can reduce interference to other devices, thus achieving higher cell-splitting gain.

Figure 5:
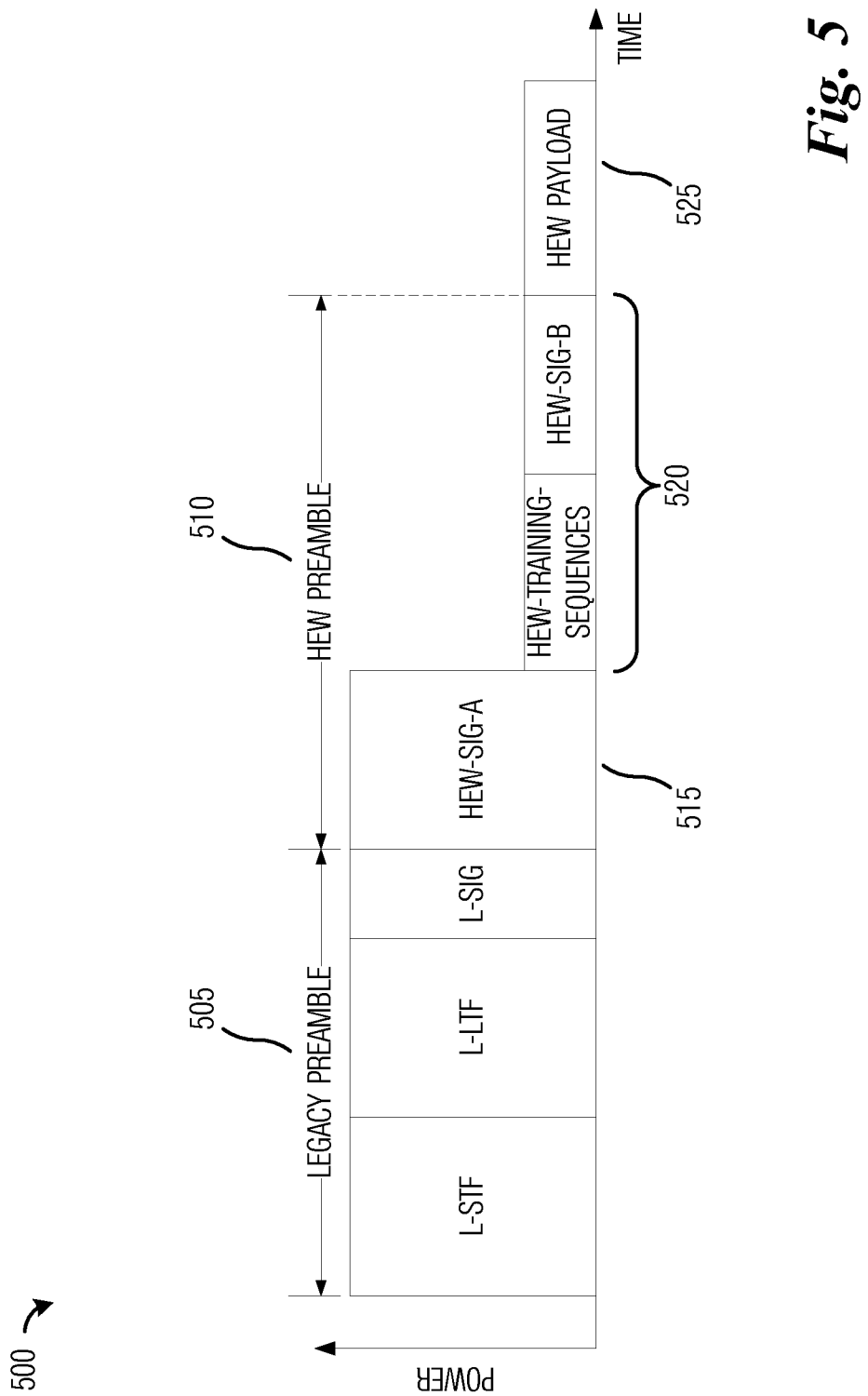
FIG. 5 illustrates a diagram of an example HEW frame with a portion being transmitted at a high power level and a portion being transmitted at a low power level in accordance with an embodiment.

FIG. 5 illustrates a diagram of an example HEW frame 500 with a portion being transmitted at a high power level and a portion being transmitted at a low power level. As discussed previously, HEW frame 500 includes a legacy preamble 505 transmitted at a high power level and a HEW preamble 510 with a first portion 515 transmitted at the high power level and a second portion 520 transmitted at a low power level. HEW frame 500 may also include a HEW payload 525 transmitted at the low power level.

Figure 6:
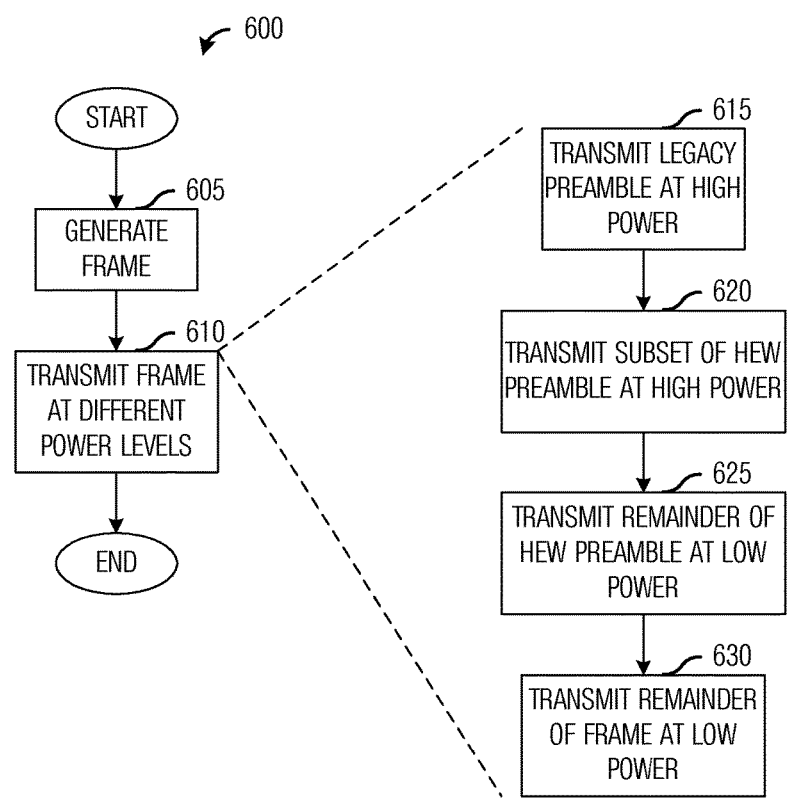
FIG. 6 illustrates a flow diagram of first example operations 600 occurring in a transmitting device as the transmitting device transmits a HEW frame with a portion being transmitted at a high power level and a portion being transmitted at a low power level in accordance with an embodiment.

FIG. 6 illustrates a flow diagram of first example operations 600 occurring in a transmitting device as the transmitting device transmits a HEW frame with a portion being transmitted at a high power level and a portion being transmitted at a low power level. Operations 600 may be indicative of operations occurring in a transmitting device, such as a transmitting AP or a transmitting STA, as the transmitting device transmits a HEW frame with a portion being transmitted at a high power level and a portion being transmitted at a low power level.

Operations 600 may begin with the transmitting device generates a frame (block 605). The frame includes a portion (including a legacy preamble and a subset of a HEW preamble) transmitted at a high power level and a portion (including a remainder of the HEW preamble and a HEW payload) transmitted at a low power level. The transmitting device may transmit the frame at different power levels (block 610).

Transmitting the frame at different power levels may include transmitting the legacy preamble at the high power level (block 615). The transmitting device may also transmit a subset of the HEW preamble at the high power level (block 620). The transmitting device may transmit the remainder of the HEW preamble at the low power level (block 625). A remainder of the frame may be transmitted at the low power level (block 630).

Figures 7A, 7B:
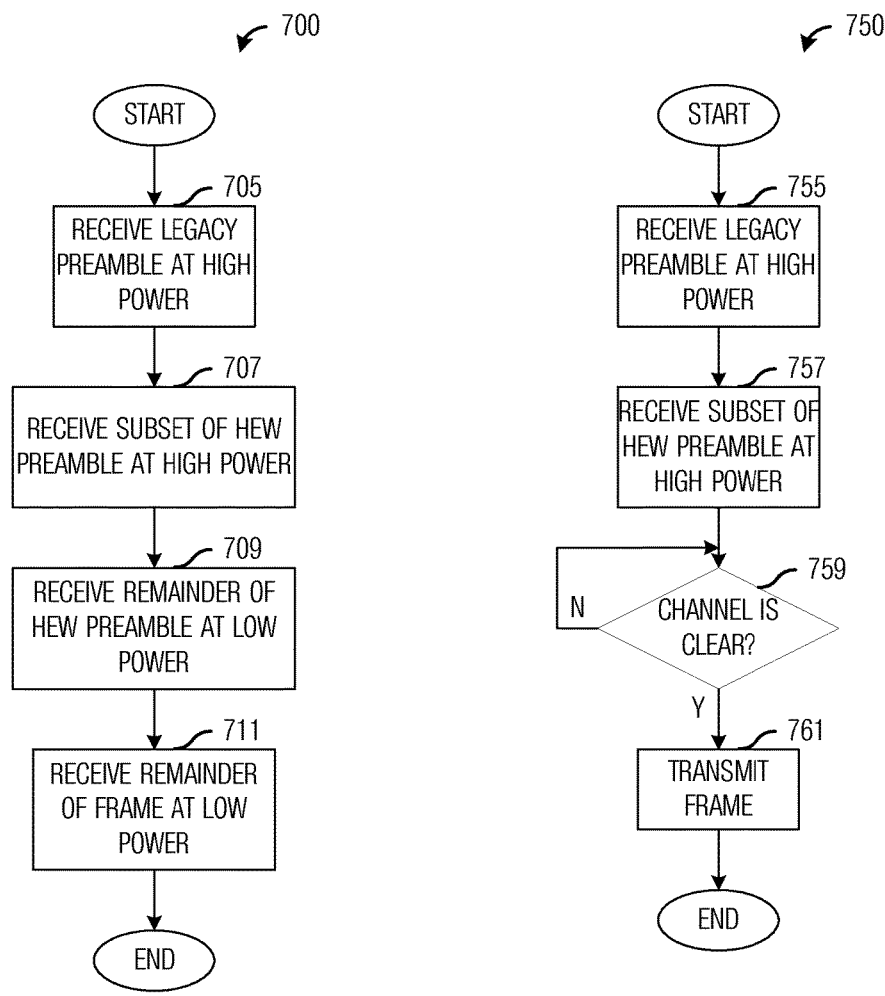
FIGS. 7a and 7b illustrate flow diagrams of first example operations 700 occurring in a receiving device and neighbor devices as the device receives a HEW frame with a portion being transmitted at a high power level and a portion being transmitted at a low power level in accordance with an embodiment.

FIG. 7a illustrates a flow diagram of first example operations 700 occurring in a receiving device as the receiving device receives a HEW frame with a portion being transmitted at a high power level and a portion being transmitted at a low power level. Operations 700 may be indicative of operations occurring in a receiving device, such as a receiving AP or a receiving STA, as the transmitting device transmits a HEW frame with a portion being transmitted at a high power level and a portion being transmitted at a low power level.

Operations 700 may begin with the receiving device receiving a legacy preamble of the HEW frame at a high power level (block 705). The receiving device may also receive a subset of a HEW preamble at the high power level (block 707). The receiving device may receive a remainder of the HEW preamble at a low power level (block 709). The receiving device may receive a remainder of the HEW frame at the low power level (block 711).

FIG. 7b illustrates a flow diagram of first example operations 750 occurring in a HEW neighbor device as the HEW neighbor device operates near a receiving device of a HEW frame. Operations 750 may be indicative of operations occurring in a HEW neighbor device, such as a HEW AP or a HEW STA, as the HEW neighbor device operates near the receiving device of the HEW frame.

Operations 750 may begin with the HEW neighbor device receiving a legacy preamble of the HEW frame at a high power level (block 755). The HEW neighbor device may receive a subset of a HEW preamble at the high power level (block 757). From the legacy preamble and/or the subset of the HEW preamble, the HEW neighbor device may be able to determine that it is not the intended recipient of the HEW frame. As an illustrative example, the subset of the HEW preamble comprises an indicator that indicates the identifier of the intended recipient of the HEW frame. The identifier may be in the form of a partial association identifier (PAID). By comparing its own PAID to the PAID indicated in the subset of the HEW preamble, the HEW neighbor device may be able to determine that it is not the intended recipient of the HEW frame. As another illustrative example, the subset of the HEW preamble may comprise an indicator that indicates a short identifier of the AP associated with the HEW frame (e.g., the AP is either the transmitter or the recipient of the HEW frame). The short identifier may be in the form of a few bits. By comparing its associated AP's short identifier with the short AP identifier indicated in the subset of the HEW preamble, the HEW neighbor device may be able to determine that it is not the intended recipient of the HEW frame. From the legacy preamble and/or the subset of the HEW preamble, the HEW neighbor device may also be able to determine if the channel is clear. Detailed discussion of the HEW neighbor device determining if the channel is clear is provided below. The HEW neighbor device may perform a check to determine if the channel is clear (block 759). If the channel is clear, the HEW neighbor device may transmit its own frame (block 761). The transmission made by the HEW neighbor device may be at a low power level. If the channel is not clear, the HEW neighbor device may return to block 759 to wait until the channel becomes clear, for example.

A HEW device may be able to determine if a channel is clear by performing a CCA. The CCA may take into consideration information derived from a frame (e.g., a legacy frame, a PLCP frame of an IEEE 802.11ac communications system, a HEW frame, and the like), as well as a HEW preamble of a HEW frame. As an illustrative example, a HEW device receives a legacy preamble and a HEW preamble of a HEW frame. A subset of the HEW preamble may comprise an indicator that indicates if the remainder of the HEW frame is transmitted in a power level lower than that of the legacy preamble and the subset of the HEW preamble. By reading the indicator, the HEW device may determine if the remainder of the HEW frame is transmitted in a power level lower than that of the legacy preamble and the subset of the HEW preamble. If so, the HEW device may continue measuring the received signal strength over the remainder of the HEW frame and compare it to a threshold. If the measured received signal strength is lower than the threshold, the HEW device may determine that the channel is clear for the duration of the remainder of the HEW frame. As another illustrative example, a HEW device receives a legacy preamble and a HEW preamble of a HEW frame. A subset of the HEW preamble may comprise an indicator that indicates the power level difference between the legacy preamble and the subset of the HEW preamble and the remainder of the HEW frame. The HEW device may measure the received signal strength over the legacy preamble and/or the subset of the HEW frame, and subtract the power level deference from the received signal strength to derive an estimated received signal strength of the remainder of the HEW frame. The HEW device may compare the estimated received signal strength of the remainder of the HEW frame to a threshold. If it is lower than the threshold, the HEW device may determine that the channel is clear for the duration of the remainder of the HEW frame. In general, the CCA determines an expected duration of the frame and does not denote the channel as being clear until after the expected duration of the frame has expired. As an illustrative example, if through analysis of a frame, the CCA determines that the frame (potentially including a HEW preamble) is expected to be 2 ms in duration, then the channel is not expected to be clear until at least time_of_beginning_of_frame+2 ms.

According to an example embodiment, the HEW-SIG-A field may carry an indication of the power level difference between that of the HTP portion (e.g., the legacy preamble and the HEW-SIG-A) and that of the LTP portion (e.g., HEW-Training-Sequences, HEW-SIG-B, and HEW payload). Since the power level difference between the HTP and LTP portion is explicitly indicated, the indication of the power level difference can facilitate a faster Automatic Gain Control (AGC) operation at the receiving device when reception is switched from receiving the HTP portion to receiving the LTP portion of the frame. As an illustrative example, the HEW-SIG-A field can carry an indication indicating that the HTP is 6 dB higher than the LTP. The receiver, after receiving this indication, can adjust its AGC accordingly. This indication of power level difference can also be used by nearby HEW LTP APs/STAs to perform CCA for the HEW LTP portion. As an example, if the CCA based on the HTP portion indicates a received power of −77 dBm, using the example above with 6 dB power difference, the nearby HEW LTP APs/STAs can derive that the received power of the LTP portion will be about −77−6=−83 dBm. Assuming the CCA threshold is −82 dBm, and since −83 dBm<−82 dBm, the CCA will indicate that the channel is clear and is available for use by the nearby HEW LTP devices with low transmission power.

According to an example embodiment, the HEW-SIG-A field can further carry an indication of the power level of the LTP portion (e.g., HEW-Training-Sequences, HEW-SIG-B, and HEW payload). The indication can be an explicit indication, e.g., 15 dBm for the LTP portion. The indication can also be an implicit indication by indicating the power level of the HTP portion. Combined with the indication of power difference between the HTP and LTP portion, the power level of LTP can be derived. As an example, the indication can be that the HTP portion is 21 dBm. Combined with the indication of power difference between HTP and LTP, e.g., 6 dB, the power level of LTP can be derived as 21−6=15 dBm. Upon receiving the indication of the power level of the LTP portion, and if their CCA indicates the channel is clear for the LTP portion, the nearby HEW LTP device(s) can adjust its transmission power according to the received indication of power level of the LTP portion to avoid causing high interference to the ongoing LTP transmission. As an example, using the example above, upon receiving the indication of 15 dBm for the LTP portion, the nearby HEW LTP device(s) can lower their transmission power to 15 dBm and start transmission if their CCA indicate that the channel is not busy.

According to an example embodiment, the HEW LTP device may transmit the legacy preamble with high power level, while transmitting the HEW-SIG-A, HEW-Training-Sequences, HEW-SIG-B, and HEW payload with low power level. The L-SIG comprises indication that the following HEW transmission (e.g., HEW-SIG-A, HEW-Training-Sequences, HEW-SIG-B, and HEW payload) will be in low power level. This may require a change of the current L-SIG, e.g., the reserved bit in current L-SIG can be used for this indication. This indication can enable notifying the nearby HEW LTP device(s) that low power transmission will follow, therefore the nearby HEW LTP device(s) is allowed to transmit with low transmission power in the duration of LTP HEW transmission if their CCA indicate that the channel is clear. The high power level for legacy preamble will enable the nearby legacy device(s) to detect the L-SIG, thereby deriving the duration of HEW transmission and thus restraining themselves from transmitting in that duration, avoiding causing interference to the HEW LTP device.

The low power level for the HEW transmission (e.g., HEW-SIG-A, HEW-Training-Sequences, HEW-SIG-B, and HEW payload) can reduce interference to other device(s), thus achieving higher cell-splitting gain. This example embodiment: May have longer duration of LTP portion (e.g., including also HEW-SIG-A); May require that HEW-SIG-A use PSK type of modulation, since its demodulation has to rely on reference signal in LTF, which has different power level than HEW-SIG-A; May require a better AGC at the receiver since there is no indication of power level difference between HTP and LTP to facilitate the AGC operation; May have less accurate CCA for the HEW LTP portion at the nearby devices as there is no indication of power level difference between HTP and LTP; and may have less accurate transmission power adjustment for the nearby devices since there is no indication of power level of LTP portion.

Figure 8:
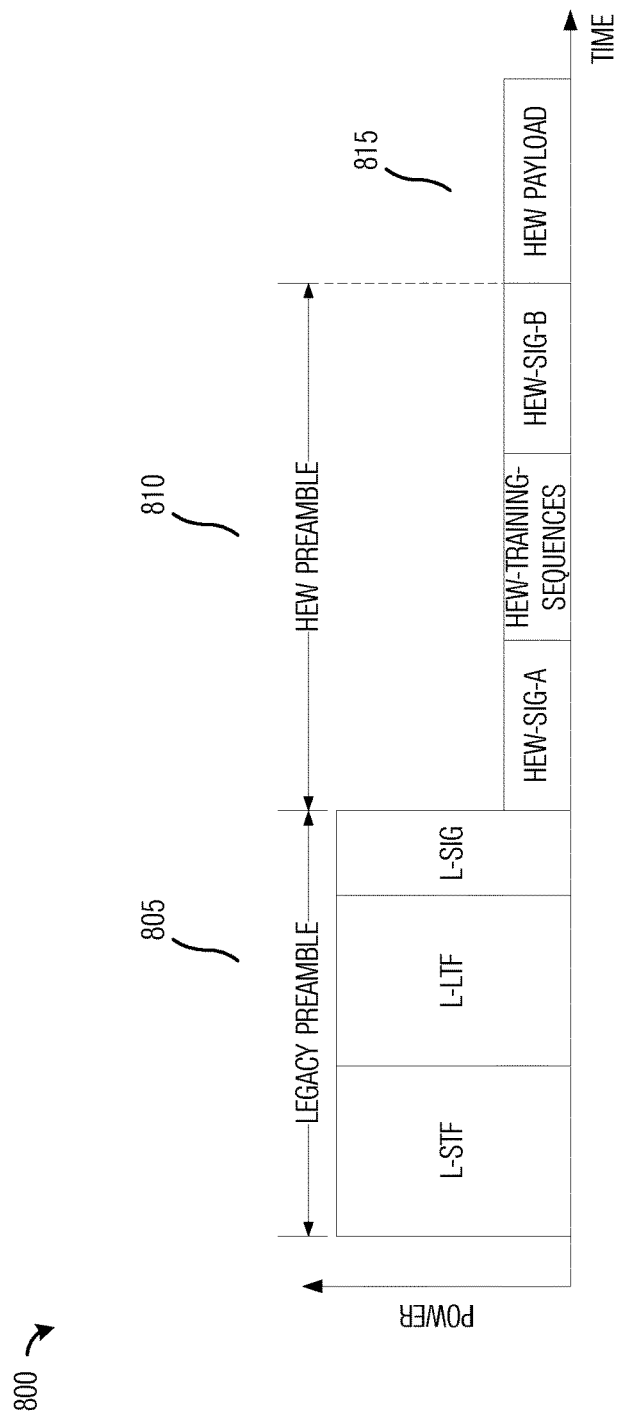
FIG. 8 illustrates a diagram of an example HEW transmission with a legacy portion including an indication that a subsequent HEW portion is transmitted at a low power level in accordance with an embodiment.

FIG. 8 illustrates a diagram of an example HEW frame 800 with a legacy preamble being transmitted at a high power level and a HEW preamble being transmitted at a low power level. As discussed previously, HEW frame 800 includes a legacy preamble 805 transmitted at a high power level and a HEW preamble 810 transmitted at a low power level. HEW frame 800 may also include a HEW payload 815 transmitted at the low power level.

Figure 9:
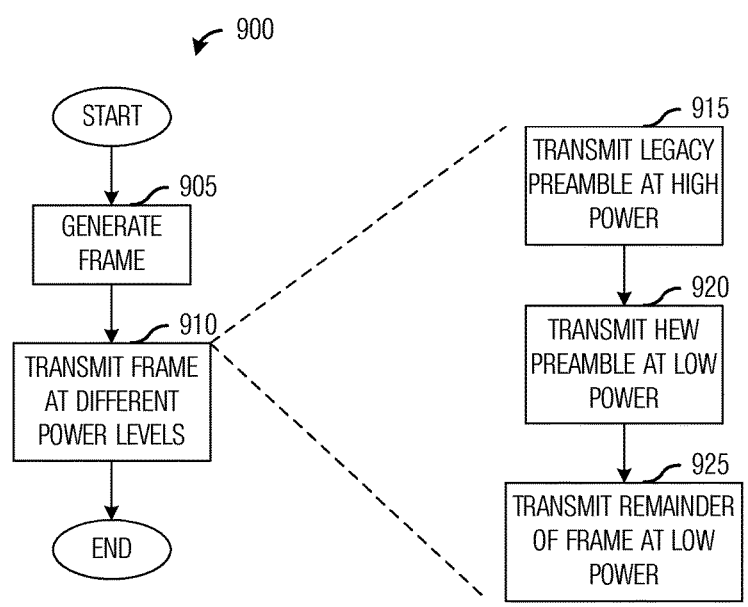
FIG. 9 illustrates a flow diagram of second example operations 600 occurring in a transmitting device as the transmitting device transmits a HEW frame with a portion being transmitted at a high power level and a portion being transmitted at a low power level in accordance with an embodiment.

FIG. 9 illustrates a flow diagram of second example operations 900 occurring in a transmitting device as the transmitting device transmits a HEW frame with a portion being transmitted at a high power level and a portion being transmitted at a low power level. Operations 900 may be indicative of operations occurring in a transmitting device, such as a transmitting AP or a transmitting STA, as the transmitting device transmits a HEW frame with a portion being transmitted at a high power level and a portion being transmitted at a low power level.

Operations 900 may begin with the transmitting device generates a frame (block 905). The frame includes a portion (including a legacy preamble) transmitted at a high power level and a portion (including a HEW preamble and a HEW payload) transmitted at a low power level. The transmitting device may transmit the frame at different power levels (block 910).

Transmitting the frame at different power levels may include transmitting the legacy preamble at the high power level (block 915). The transmitting device may transmit the remainder of the HEW preamble at the low power level (block 920). A remainder of the frame may be transmitted at the low power level (block 925).

Figures 10A, 10B:
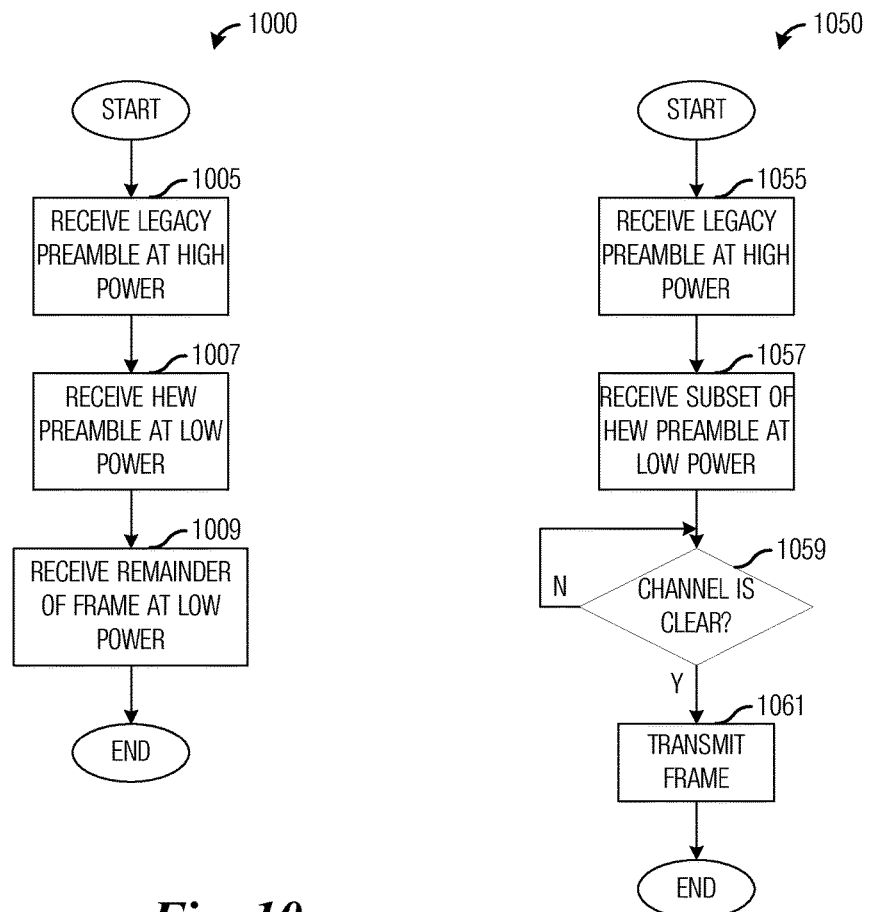
FIGS. 10a and 10b illustrate flow diagrams of second example operations 700 occurring in a receiving device and neighbor devices as the device receives a HEW frame with a portion being transmitted at a high power level and a portion being transmitted at a low power level in accordance with an embodiment.

FIG. 10a illustrates a flow diagram of first example operations 1000 occurring in a receiving device as the receiving device receives a HEW frame with a portion being transmitted at a high power level and a portion being transmitted at a low power level. Operations 1000 may be indicative of operations occurring in a receiving device, such as a receiving AP or a receiving STA, as the transmitting device transmits a HEW frame with a portion being transmitted at a high power level and a portion being transmitted at a low power level.

Operations 1000 may begin with the receiving device receiving a legacy preamble of the HEW frame at a high power level (block 1005). The receiving device may receive a HEW preamble at a low power level (block 1007). The receiving device may receive a remainder of the HEW frame at the low power level (block 1009).

FIG. 10b illustrates a flow diagram of first example operations 1050 occurring in a HEW neighbor device as the HEW neighbor device operates near a receiving device of a HEW frame. Operations 1050 may be indicative of operations occurring in a HEW neighbor device, such as a HEW AP or a HEW STA, as the HEW neighbor device operates near the receiving device of the HEW frame.

Operations 1050 may begin with the HEW neighbor device receiving a legacy preamble of the HEW frame at a high power level (block 1055). From the legacy preamble, the HEW neighbor device may be able to determine that it is not the intended recipient of the HEW frame. The HEW neighbor device may receive a subset of a HEW preamble at a low power level (block 1057). The HEW neighbor device may receive a HEW-SIG-A portion of the HEW preamble, for example. Alternatively, the HEW neighbor device may measure a signal strength of the subset of the HEW preamble. From the legacy preamble and/or the subset of the HEW preamble, the HEW neighbor device may be able to determine if the channel is clear. The HEW neighbor device may perform a check to determine if the channel is clear (block 1059). If the channel is clear, the HEW neighbor device may transmit its own frame (block 1061). The transmission made by the HEW neighbor device may be at a low power level. If the channel is not clear, the HEW neighbor device may return to block 1059 to wait until the channel becomes clear, for example.

Figure 11:
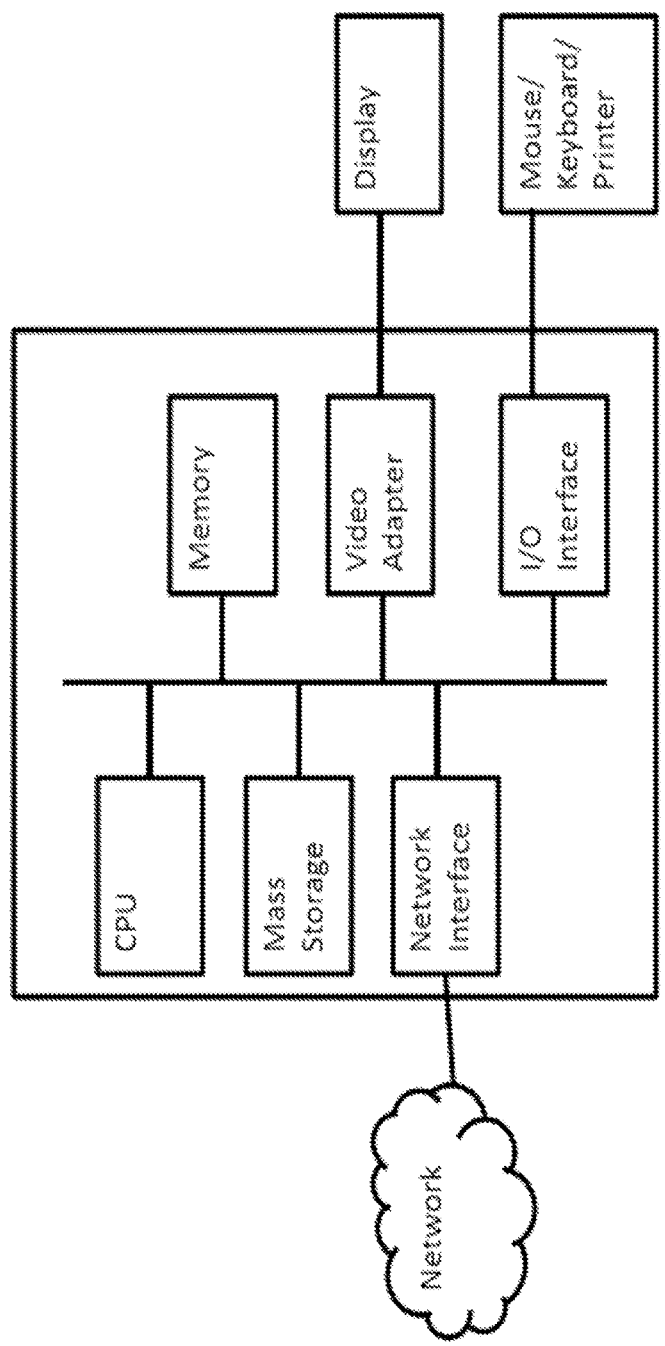
FIG. 11 illustrates a computing platform that may be used for implementing, for example, the devices and methods described herein, in accordance with an embodiment.

FIG. 11 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 12:
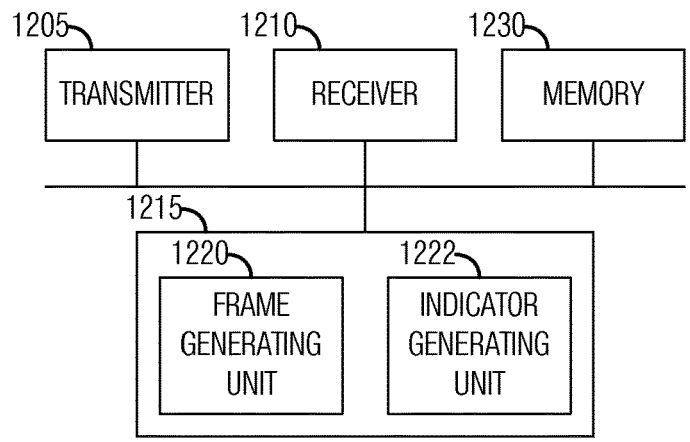
FIG. 12 illustrates an example first communications device in accordance with an embodiment.

FIG. 12 illustrates an example first communications device 1200. Communications device 1200 may be an implementation of a transmitting device, such as a transmitting AP or a transmitting STA. Communications device 1200 may be used to implement various ones of the embodiments discussed herein. As shown in FIG. 12, a transmitter 1205 is configured to transmit frames, indicators, and the like. Communications device 1200 also includes a receiver 1210 that is configured to receive frames, and the like.

A frame generating unit 1220 is configured to generate frames with a legacy header, a HEW header, and a HEW payload. An indicator generating unit 1222 is configured to generate indicators of power levels, power level differences, and the like. A memory 1230 is configured to store frames, indicators, power levels, and the like.

The elements of communications device 1200 may be implemented as specific hardware logic blocks. In an alternative, the elements of communications device 1200 may be implemented as software executing in a processor, controller, application specific integrated circuit, or so on. In yet another alternative, the elements of communications device 1200 may be implemented as a combination of software and/or hardware.

As an example, receiver 1210 and transmitter 1205 may be implemented as a specific hardware block, while frame generating unit 1220 and indicator generating unit 1222 may be software modules executing in a microprocessor (such as processor 1215) or a custom circuit or a custom compiled logic array of a field programmable logic array. Frame generating unit 1220 and indicator generating unit 1222 may be modules stored in memory 1230.

Figure 13:
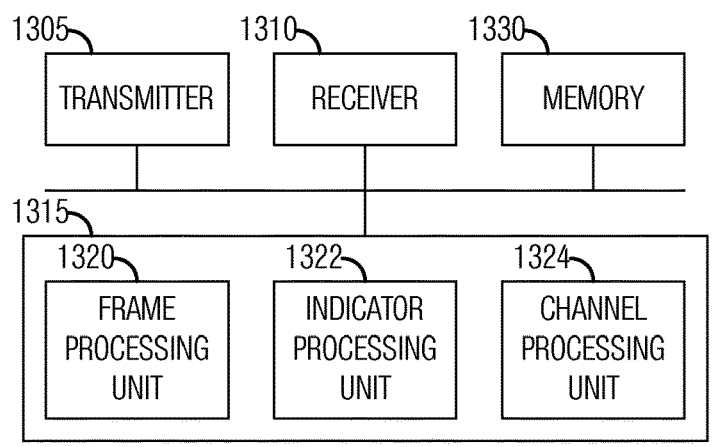
FIG. 13 illustrates an example second communications device in accordance with an embodiment.

FIG. 13 illustrates an example second communications device 1300. Communications device 1300 may be an implementation of a receiving device, such as a receiving AP or a receiving STA, or a neighbor device, such as a neighbor AP or a neighbor STA. Communications device 1300 may be used to implement various ones of the embodiments discussed herein. As shown in FIG. 13, a transmitter 1305 is configured to transmit frames, and the like. Communications device 1300 also includes a receiver 1310 that is configured to receive frames, indicators, and the like.

A frame processing unit 1320 is configured to process frames with a legacy header, a HEW header, and a HEW payload. An indicator processing unit 1322 is configured to process indicators of power levels, power level differences, and the like. A channel processing unit 1324 is configured to determine if a channel is idle or busy. A memory 1330 is configured to store frames, indicators, power levels, channel state, and the like.

The elements of communications device 1300 may be implemented as specific hardware logic blocks. In an alternative, the elements of communications device 1300 may be implemented as software executing in a processor, controller, application specific integrated circuit, or so on. In yet another alternative, the elements of communications device 1300 may be implemented as a combination of software and/or hardware.

As an example, receiver 1310 and transmitter 1305 may be implemented as a specific hardware block, while frame processing unit 1320, indicator processing unit 1322, and channel processing unit 1324 may be software modules executing in a microprocessor (such as processor 1315) or a custom circuit or a custom compiled logic array of a field programmable logic array. Frame processing unit 1320, indicator processing unit 1322, and channel processing unit 1324 may be modules stored in memory 1330.

Although the present disclosure and its advantages have been described in detail, it should be understood that various changes, substitutions and alterations can be made herein without departing from the spirit and scope of the disclosure as defined by the appended claims.

What is claimed is:

1. A method for operating a transmitting device, the method comprising:
generating, by the transmitting device, a frame having a first preamble and a second preamble;
transmitting, by the transmitting device, the first preamble and a first subset of the second preamble at a first power level; and
transmitting, by the transmitting device, a second subset of the second preamble at a second power level, the first and second subsets of the second preamble being mutually exclusive, and the first power level being higher than the second power level,
the first preamble being detectable by a first plurality of communications devices, and the second preamble being detectable by a subset of the first plurality of communications devices and not by the others of the first plurality of communication devices.

2. The method of claim 1, wherein the first subset of the second preamble comprises an indicator that indicates that the second power level is lower than the first power level.

3. The method of claim 1, wherein the first subset of the second preamble comprises an indicator that indicates a difference between the first power level and the second power level.

4. The method of claim 1, wherein the first subset of the second preamble comprises an indicator that indicates one of the first power level or the second power level.

5. The method of claim 1, wherein the frame comprises a data payload, and wherein the method further comprises transmitting the data payload at the second power level.

6. The method of claim 1, wherein the first preamble comprises an indicator that indicates that the second power level is lower than the first power level.

7. A method for operating a receiving device, the method comprising:
receiving, by the receiving device, a first preamble of a frame and a first subset of a second preamble of the frame at a first power level; and
receiving, by the receiving device, a second subset of the second preamble of the frame at a second power level, the first and second subsets of the second preamble being mutually exclusive, and the first power level being higher than the second power level,
the first preamble being detectable by a first plurality of communications devices, and the second preamble being detectable by a subset of the first plurality of communications devices and not by the others of the first plurality of communication devices.

8. The method of claim 7, wherein the first subset of the second preamble comprises an indicator that indicates that the second power level is lower than the first power level.

9. The method of claim 7, wherein the first subset of the second preamble comprises an indicator that indicates one of the first power level or the second power level.

10. The method of claim 7, wherein the first subset of the second preamble comprises an indicator that indicates a difference between the first power level and the second power level.

11. The method of claim 10, further comprising:
adjusting an automatic gain control in accordance with the indicator.

12. The method of claim 7, further comprising:
receiving a data payload of the frame at the second power level.

13. A method for operating a neighbor device, the method comprising:
receiving, by the neighbor device, a first preamble of a frame at a first power level;
after receiving the first preamble, receiving, by the neighbor device, a first subset of a second preamble of the frame, the first subset of the second preamble including a high efficiency wireless local area network (WLAN) (HEW)-signal-A (HEW-SIG-A) field, the first preamble being detectable by a first plurality of communications devices, and the first subset of the second preamble being detectable by a second plurality of communications devices that is a subset of the first plurality of communications devices;
determining, by the neighbor device, if a channel is idle in accordance with the first preamble and a content of the HEW-SIG-A field in the first subset of the second preamble; and transmitting, by the neighbor device, a transmission over the channel in response to the channel being idle.

14. The method of claim 13, wherein the first subset of the second preamble is received at the first power level.

15. The method of claim 14, wherein the first subset of the second preamble comprises a first indicator that indicates a difference between the first power level and a second power level.

16. The method of claim 14, where the first subset of the second preamble comprises a second indicator that indicates that a second power level is lower than the first power level.

17. The method of claim 14, wherein the first subset of the second preamble comprises a first indicator that indicates a difference between the first power level and a second power level, and a second indicator that indicates one of the first power level or the second power level.

18. The method of claim 17, wherein transmitting the transmission comprises determining a transmission power level in accordance with the second indicator.

19. The method of claim 13, wherein the first subset of the second preamble is received at a second power level.

20. The method of claim 13, wherein the first subset of the second preamble comprises a first indicator that indicates a difference between the first power level and a second power level, and wherein determining if the channel is idle comprises:
deriving a first received power level from the first preamble as received;
deriving a second received power level by subtracting the difference indicated by the first indicator from the first received power level; and
comparing the second received power level with a threshold.

21. A transmitting device comprising:
a non-transitory memory storage comprising instructions;
a processor operatively coupled to the memory storage, wherein the processor executes the instructions to:
generate a frame having a first preamble and a second preamble; and
transmit the first preamble and a first subset of the second preamble at a first power level, and
transmit a second subset of the second preamble at a second power level, the first and second subsets of the second preamble being mutually exclusive, and the first power level being higher than the second power level,
the first preamble being detectable by a first plurality of communications devices, and the second preamble being detectable by a subset of the first plurality of communications devices and not by the others of the first plurality of communication devices.

22. The transmitting device of claim 21, wherein the first subset of the second preamble comprises an indicator that indicates that the second power level is lower than the first power level.

23. The transmitting device of claim 21, wherein the first subset of the second preamble comprises an indicator that indicates a difference between the first power level and the second power level.

24. A neighbor device comprising:
a non-transitory memory storage comprising instructions; and
a processor operatively coupled to the memory storage, wherein the processor executes the instructions to:
receive a first preamble of a frame at a first power level, and, after receiving the first preamble, receive a first subset of a second preamble of the frame, the first subset of the second preamble including a high efficiency wireless local area network (WLAN) (HEW)-signal-A (HEW-SIG-A) field, the first preamble being detectable by a first plurality of communications devices, and the first subset of the second preamble being detectable by a second plurality of communications devices that is a subset of the first plurality of communications devices;
determine if a channel is idle in accordance with the first preamble and a content of the HEW-SIG-A field in the first subset of the second preamble; and
transmit a transmission over the channel in response to the channel being idle.

25. The neighbor device of claim 24, wherein the first subset of the second preamble comprises a first indicator that indicates a difference between the first power level and a second power level, and wherein the processor executes the instructions to derive a first received power level from the first preamble as received, to derive a second received power level by subtracting the difference indicated by the first indicator from the first received power level, and to compare the second received power level with a threshold.

26. The neighbor device of claim 24, wherein the first subset of the second preamble is received at the first power level.

27. The neighbor device of claim 24, wherein the first subset of the second preamble comprises a first indicator that indicates a difference between the first power level and a second power level.

28. The neighbor device of claim 24, wherein the first subset of the second preamble comprises a second indicator that indicates that a second power level is lower than the first power level.

29. The neighbor device of claim 24, wherein the first subset of the second preamble comprises a first indicator that indicates a difference between the first power level and a second power level and a second indicator that indicates one of the first power level or the second power level.

30. The neighbor device of claim 29, wherein the processor executes the instructions to determine a transmission power level in accordance with the second indicator.

31. The method of claim 13, wherein the first subset of the second preamble comprises an indicator that indicates one of the first power level or a second power level.

32. The transmitting device of claim 21, wherein the first subset of the second preamble comprises an indicator that indicates one of the first power level or the second power level.

33. The transmitting device of claim 21, wherein the processor executes the instructions to transmit a data payload in the frame at the second power level.

34. The neighbor device of claim 24, wherein the first subset of the second preamble comprises an indicator that indicates one of the first power level or a second power level.

35. A receiving device comprising:
a non-transitory memory storage comprising instructions; and
a processor operatively coupled to the memory storage, wherein the processor executes the instructions to:
receive a first preamble of a frame and a first subset of a second preamble of the frame at a first power level; and
receive a second subset of the second preamble of the frame at a second power level, the first and second subsets of the second preamble being mutually exclusive, and the first power level being higher than the second power level, the first preamble being detectable by a first plurality of communications devices, and the second preamble being detectable by a subset of the first plurality of communications devices and not by the others of the first plurality of communication devices.

36. The receiving device of claim 35, wherein the first subset of the second preamble comprises an indicator that indicates that the second power level is lower than the first power level.

37. The receiving device of claim 35, wherein the first subset of the second preamble comprises an indicator that indicates one of the first power level or the second power level.

38. The receiving device of claim 35, wherein the first subset of the second preamble comprises an indicator that indicates a difference between the first power level and the second power level.

39. The receiving device of claim 38, further comprising the processor operable to execute the instructions to adjust an automatic gain control in accordance with the indicator.

40. The receiving device of claim 35, further comprising the processor operable to execute the instructions to receive a data payload of the frame at the second power level.

\* \* \* \* \*